(12) United States Patent
Aihara

(10) Patent No.: US 12,734,597 B2
(45) Date of Patent: Sep. 15, 2026

(54) CUT MEMBER PROCESSING DEVICE AND CUTTING SYSTEM

(71) Applicants: AMADA CO., LTD., Kanagawa (JP); AMADA MACHINERY CO., LTD., Kanagawa (JP)

(72) Inventor: Shoji Aihara, Kanagawa (JP)

(73) Assignees: AMADA CO., LTD., Kanagawa (JP); AMADA MACHINERY CO., LTD., Kanagawa (JP)

( * ) Notice: Subject to any disclaimer, the term of this patent is extended or adjusted under 35 U.S.C. 154(b) by 122 days.

(21) Appl. No.: 18/845,529

(22) PCT Filed: Feb. 22, 2023

(86) PCT No.: PCT/JP2023/006453
§ 371 (c)(1),
(2) Date: Sep. 10, 2024

(87) PCT Pub. No.: WO2023/176344
PCT Pub. Date: Sep. 21, 2023

(65) Prior Publication Data

US 2025/0187088 A1 Jun. 12, 2025

(30) Foreign Application Priority Data

Mar. 14, 2022 (JP) ................................ 2022-039471

(51) Int. Cl.
*B23D 45/00* (2006.01)
*B23D 47/00* (2006.01)
(Continued)

(52) U.S. Cl.
CPC ......... *B23D 59/003* (2013.01); *B23D 45/003* (2013.01); *B23D 47/00* (2013.01); *B23D 47/042* (2013.01)

(58) Field of Classification Search
CPC ..... B23D 47/00; B23D 59/001; B23D 59/003
See application file for complete search history.

(56) References Cited

U.S. PATENT DOCUMENTS 3,459,246 A * 8/1969 Ottosson .................. B27B 1/00 83/789
3,610,315 A * 10/1971 Juergens .............. C21C 5/5294 266/143
(Continued)

FOREIGN PATENT DOCUMENTS

JP 3281403 B 5/2022

OTHER PUBLICATIONS

International Search Report for corresponding Application No. PCT/JP2023/006453, mailed May 16, 2023.
(Continued)

*Primary Examiner* — Sean M Michalski
(74) *Attorney, Agent, or Firm* — Renner, Otto, Boisselle & Sklar, LLP

(57) ABSTRACT

A cut member processing device includes a marking device configured to put a mark on a cut surface of a cut member cut out from a metal long workpiece by a cutting device; and a product length acquisition unit configured to measure and store a product length of the cut member. The product length acquisition unit is configured to measure the product length under a state where the cut member is located at a position that allows the marking device to put the mark on the cut surface.

4 Claims, 9 Drawing Sheets

(51) Int. Cl.
*B23D 47/04* (2006.01)
*B23D 59/00* (2006.01)

(56) References Cited

U.S. PATENT DOCUMENTS 3,676,652 A * 7/1972 Millis, Jr. .............. G01B 21/06 702/158
3,771,613 A * 11/1973 Forster ................... G01G 19/00 177/60
4,670,638 A * 6/1987 Pavlin .................. B23K 26/082 219/121.78
4,691,830 A * 9/1987 Ahl ....................... B07C 5/3408 65/29.12
4,735,399 A * 4/1988 Lotz ..................... B22D 11/126 266/50
4,765,213 A * 8/1988 Kondo ................. G01B 5/0002 83/61
5,143,131 A * 9/1992 Seigneur ............... B27B 17/025 144/34.1
5,224,950 A * 7/1993 Prywes ................. A61F 9/0133 606/166
5,243,128 A * 9/1993 Marcoz .................. G01B 7/003 324/207.16
5,353,230 A * 10/1994 Maejima ............ G05B 19/4183 235/375
5,373,039 A * 12/1994 Sakai ..................... B41M 5/267 524/424
5,811,779 A * 9/1998 Gaylord, Jr. ............. G06K 7/14 235/462.15
6,050,166 A * 4/2000 Gauler .................. B26D 5/007 83/365
6,299,122 B1 * 10/2001 Bame ..................... G01B 11/24 359/896
6,360,638 B1 * 3/2002 White ................ B65H 23/1886 83/13
6,630,993 B1 * 10/2003 Hedges .................. G06Q 10/08 356/141.5
6,973,361 B1 * 12/2005 Hammond ............. G06Q 10/06 700/104
7,040,844 B1 * 5/2006 Daiguji ................. B23C 5/2213 407/113
7,069,105 B2 * 6/2006 Reinisch .............. G05B 19/056 700/20
7,267,436 B2 * 9/2007 Ito .................... B29D 11/00951 351/159.75
9,958,854 B2 * 5/2018 Vasquez ............... G05B 19/401
10,825,166 B2 * 11/2020 Parikh ........................ G06T 7/62
2001/0028534 A1 * 10/2001 Watanabe .......... G11B 23/0308
2002/0056606 A1 * 5/2002 Reinisch .............. G05B 19/056 198/348
2005/0046792 A1 * 3/2005 Ito .................... B29D 11/00009 351/159.75
2005/0060040 A1 * 3/2005 Auxepaules .............. A61F 2/34 623/22.21
2005/0187831 A1 * 8/2005 Gershburg ........... G06Q 10/087 705/27.2
2006/0092999 A1 * 5/2006 Machida ............... H01S 3/1312 372/38.03
2006/0203469 A1 * 9/2006 Niemann ............... B23Q 1/626 362/802
2007/0001638 A1 * 1/2007 Gray ...................... B25J 9/1692 318/568.11
2008/0066869 A1 * 3/2008 Yamamoto ............ B26F 1/3846 156/353
2013/0075296 A1 * 3/2013 Ramsey ............... B65D 17/401 206/459.5
2013/0329012 A1 * 12/2013 Bartos ....................... G06T 7/80 348/46
2014/0084003 A1 * 3/2014 Ramsey ................. B65D 51/00 413/18
2014/0365061 A1 * 12/2014 Vasquez ............... G05B 19/401 901/44
2015/0003685 A1 * 1/2015 Ohno ...................... G06T 7/521 382/106
2017/0164554 A1 * 6/2017 Roberts .................. A01D 41/06
2018/0257305 A1 * 9/2018 Jones .................... B29C 64/106
2019/0392570 A1 * 12/2019 Parikh ................ G06V 10/7515

OTHER PUBLICATIONS

Written Opinion for corresponding Application No. PCT/JP2023/006453, mailed May 16, 2023.

* cited by examiner

ST
91
1
2
31(3)
REAR
RIGHT
FRONT
LEFT
W
W1
AR1
51
(5)
DR1
61
92
921
922
W2
AR2
52
(5)
DR2
931
A
93
932
62
W
4
32
(3)
11

76
761
722
Ls
75b(75)
71
762
723
72
P1t
Ln
721
711a
711
742c
M
DR51
P1
P1
UP
REAR
LEFT
742
75a
(75)
DR7
FRONT
RIGHT
DOWN
P1
732
731
742c
742a
79
79
742
741
741
74
R2
743
84
(8)
743a
DR6
73
731
74
743
7
741
R1
743a
94
95

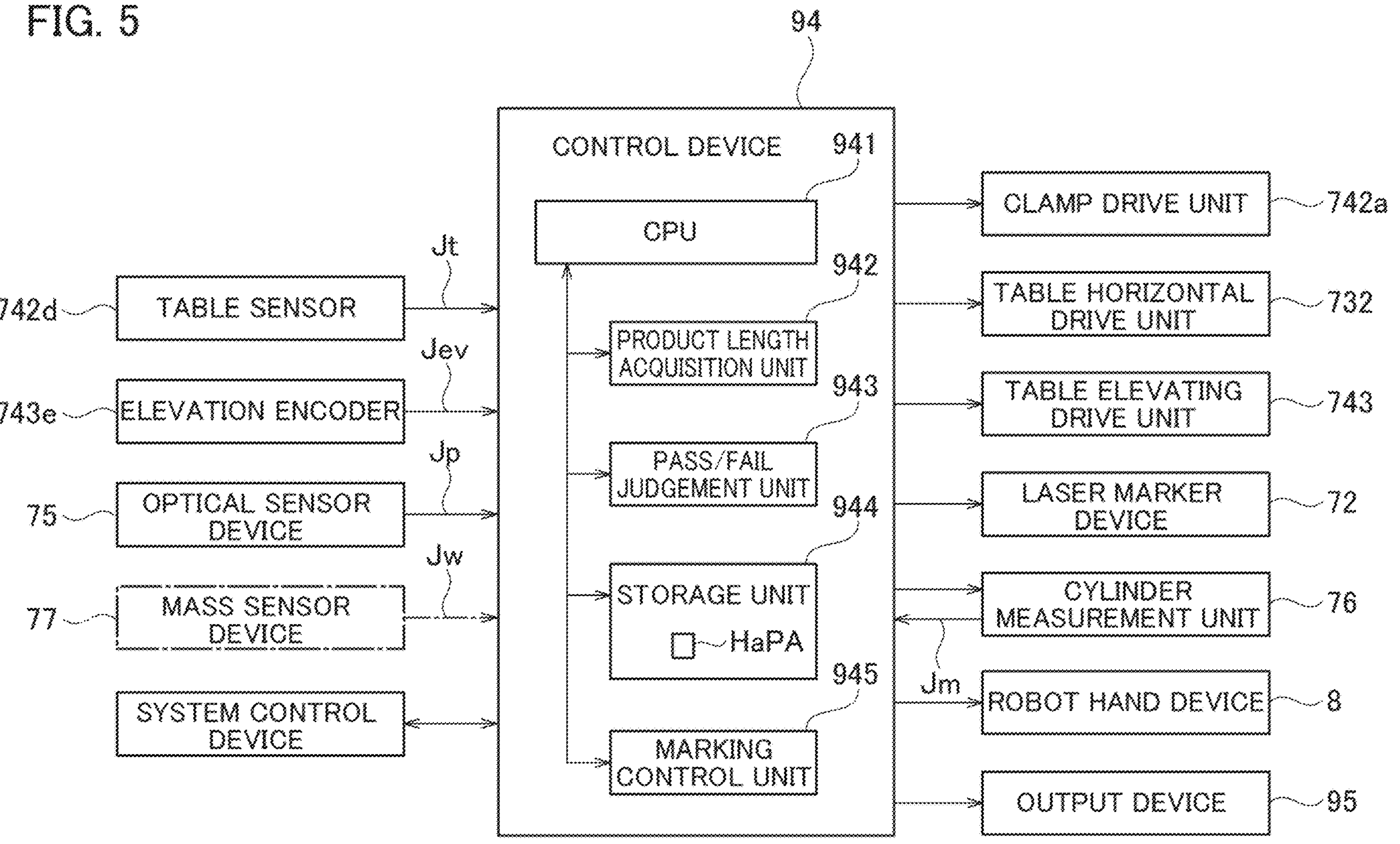
FIG. 5
94
CONTROL DEVICE
941
CPU
942
PRODUCT LENGTH ACQUISITION UNIT
943
PASS/FAIL JUDGEMENT UNIT
944
STORAGE UNIT
HaPA
945
MARKING CONTROL UNIT
742d
TABLE SENSOR
Jt
743e
ELEVATION ENCODER
Jev
75
OPTICAL SENSOR DEVICE
Jp
77
MASS SENSOR DEVICE
Jw
SYSTEM CONTROL DEVICE
CLAMP DRIVE UNIT
742a
TABLE HORIZONTAL DRIVE UNIT
732
TABLE ELEVATING DRIVE UNIT
743
LASER MARKER DEVICE
72
CYLINDER MEASUREMENT UNIT
76
Jm
ROBOT HAND DEVICE
8
OUTPUT DEVICE
95

1
S8
MEASURED PRODUCT LENGTH HaP IS ACQUIRED
S9
MEASURED PRODUCT LENGTH HaP IS PASS?
YES
NO
S10
LASER MARKING IS DONE
S11
TABLE MAIN BODY 742 IS MOVED DOWNWARD
S12
MOVED TO LOADING/ UNLOADING POSITION R2
S13
CLAMPING IS RELEASED
END
S14
LENGTH MEASUREMENT BY CYLINDER MEASUREMENT UNIT 76
S15
AUXILIARY MEASURED PRODUCT LENGTH HaP2 IS PASS?
YES
NO
S16
ALARM IS OUTPUT

CUT MEMBER PROCESSING DEVICE AND CUTTING SYSTEM

TECHNICAL FIELD

The present disclosure relates to a cut member processing device and a cutting system.

BACKGROUND ART

Patent Literature 1 describes a cutting device including a cutting unit such as a saw machine that cuts a long workpiece, and a printing device that performs printing on a cut surface of a cut member made by a cutting work of the cutting unit.

CITATION LIST

Patent Literature

[Patent Literature 1]Japanese Granted Patent Publication No. 3281403

SUMMARY OF INVENTION

For the cut member made by the conventional cutting device as described in Patent Literature 1, its length is measured so that a pass/fail judgement as to whether or not the cut member adapts to the specification as a product is performed. A length measuring device configured to measure the length of the cut member is provided independently from the cutting device, so that a total time period of a time period required for moving the cut member from the cutting device to the length measuring device and a time period of measuring the length of the cut member in the length measuring device is required separately from an operation time period of the cutting device.

An aspect of the present embodiment is a cut member processing device that includes: a marking device configured to put a mark on a cut surface of a cut member cut out from a metal long workpiece by a cutting device; and a product length acquisition unit configured to measure and store a product length of the cut member, wherein the product length acquisition unit is configured to measure the product length under a state where the cut member is located at a position that allows the marking device to put the mark on the cut surface.

Further, an aspect of the present embodiment is a cutting system that includes: a cutting device configured to cut out a cut member from a metal long workpiece; a cut member processing device provided with a marking device configured to put a mark on a cut surface of the cut member and a product length acquisition unit configured to measure and store a product length of the cut member, the product length acquisition unit being configured to measure the product length under a state where the cut member is located at a position that allows the marking device to put the mark on the cut surface; and a robot hand device configured to load the cut member cut out by the cutting device into the cut member processing device.

In the cut member processing device according to the aspect of the present embodiment, no time is required to move the cut member from the cutting device to the length measuring device in order to measure the product length, and also no time is required only for length measurement.

According to the aspect of the present embodiment, the productivity of the cut member on which the mark is put thereon can be improved.

BRIEF DESCRIPTION OF DRAWINGS

FIG. 5 is a block diagram illustrating a configuration of the cut member processing device 7 according to the one embodiment.

DESCRIPTION OF EMBODIMENTS

Figure 1:
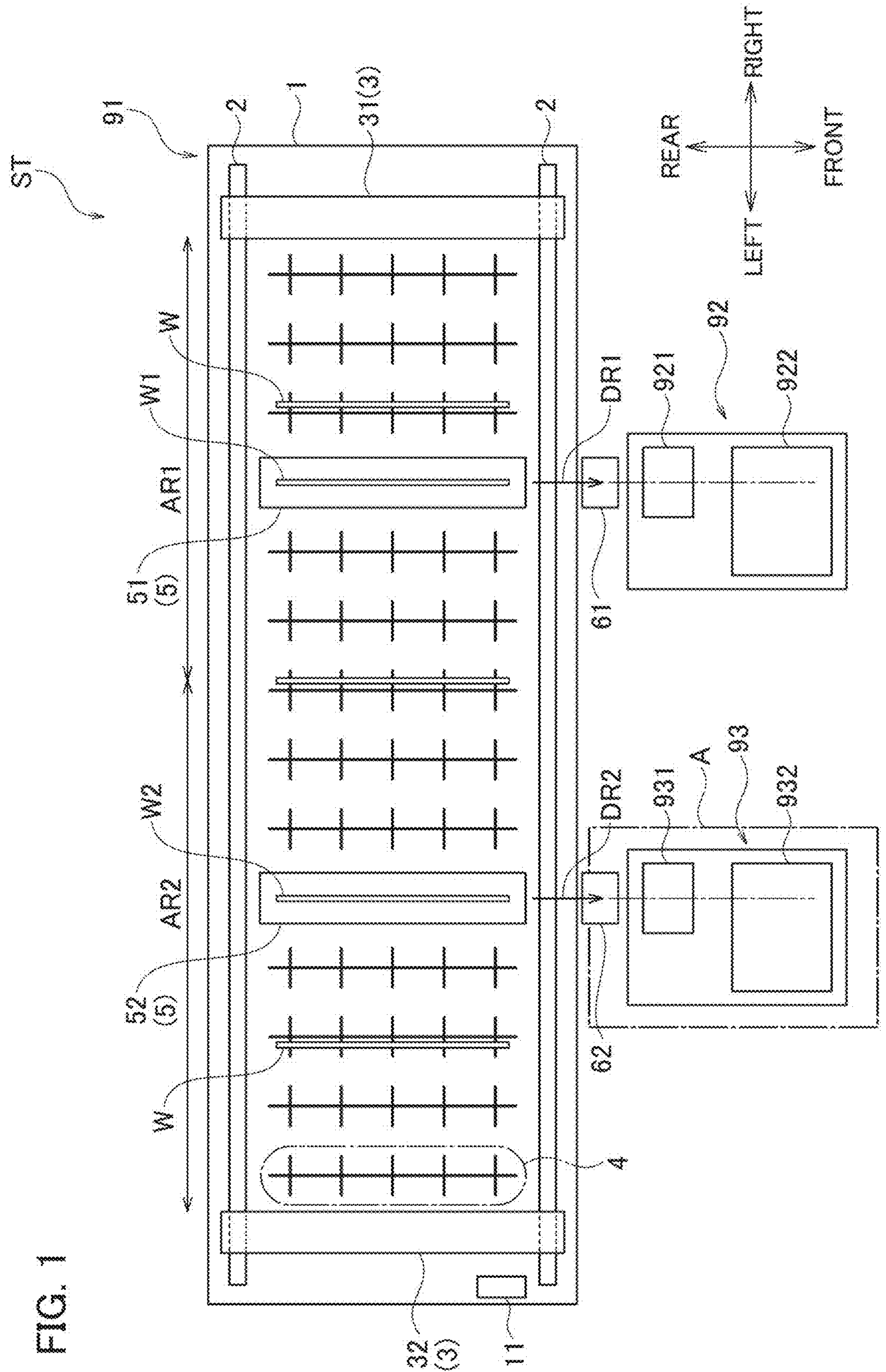
FIG. 1 is a view of a cutting system group ST including a cutting system 93 according to one embodiment.

FIG. 1 is a view of a cutting system group ST including a cutting system 93 according to one embodiment. For the sake of convenience of description, directions of front, rear, left and right are defined as directions of arrows illustrated in FIG. 1, respectively. An upward direction is a direction toward the front of its paper, and a downward direction is a direction toward the back of its paper.

The cutting system group ST includes a shelf device 91, and a first cutting system 92 and a second cutting system 93. The shelf device 91 can store a large number of long workpieces, and schematically has a right-left length of about 40 m and each of a front-rear length and a height of about 10 m, and is installed on a floor inside of a building. The shelf device 91 includes a frame base 1, a pair of running rails 2, crane devices 3, support shelves 4, and feeders 5.

The frame base 1 is a frame member formed into a rectangular shape in top view, and includes the running rails 2 extending left to right at both edges on its front and rear sides. Each of the support shelves 4 is a shelf configured to support a long metal workpiece W at a posture at which its longitudinal extends in the front-rear direction. The support shelf 4 includes plural stages of workpiece support arms in the up-down direction. The workpiece W is placed on each workpiece support arm to be stored in the support shelf 4.

Each of the crane devices 3 is supported by the pair of running rails 2 so as to be movable in the right-left direction, and extends in the front-rear direction to have a gate shape raising upward. The crane devices 3 include a first crane device 31 configured to move in a range AR1 in the right-left direction, and a second crane device 32 configured to move in a range AR2. Each of the first crane device 31 and the second crane device 32 picks up the workpiece W placed at any position of the support shelf 4. The first crane device 31 and the second crane device 32 convey the picked-up workpiece W to a first feeder 51 and a second feeder 52 included in the feeder 5. The first feeder 51 and the second feeder 52 are provided at lower portions of the shelf device 91 so as to be spaced apart from each other in the right-left direction.

A workpiece W1 conveyed to the first feeder 51 by the first crane device 31 is sent via a first relay conveyor 61 toward the first cutting system 92 installed on the front side (see an arrow DR1). A workpiece W2 conveyed to the second feeder 52 by the second crane device 32 is sent via a second relay conveyor 62 toward the second cutting system 93 installed on the front side (see an arrow DR2).

The first cutting system 92 includes a band saw machine 921 serving as a cutting device, and an unloading unit 922. The second cutting system 93 includes a circular saw machine 931 serving as a cutting device, and an unloading unit 932. The first cutting system 92 and the second cutting system 93 cut the long workpiece W1 and the workpiece W2 supplied from the first feeder 51 and the second feeder 52, respectively, into predetermined lengths by the cutting devices, and put marks thereon. The operation of the shelf device 91 is controlled by a shelf control unit 11.

Figure 2:
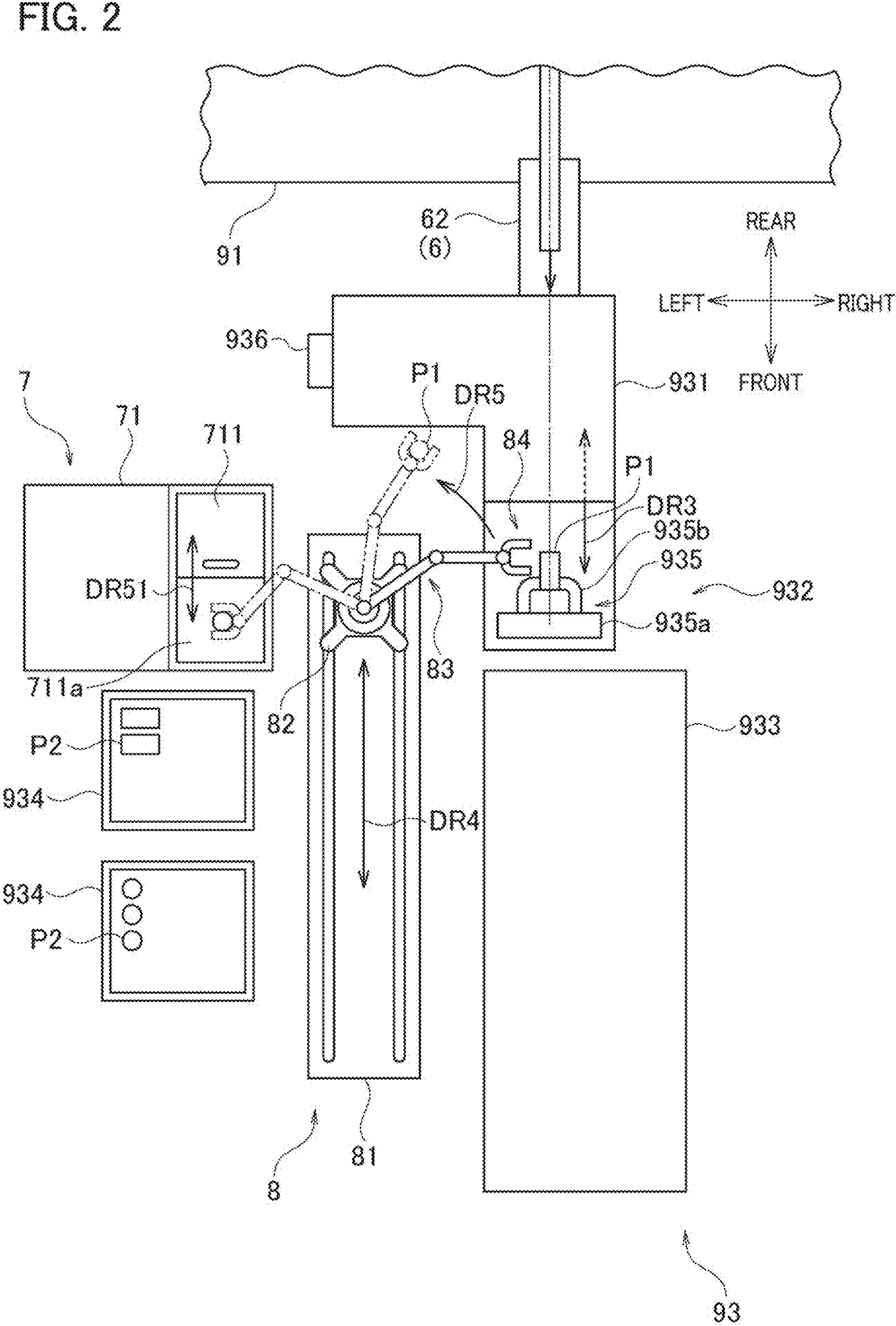
FIG. 2 is a top view of the cutting system 93.

FIG. 2 is a schematic top view of the second cutting system 93. The second cutting system 93 and the first cutting system 92 have substantially similar configurations. In the following, the second cutting system 93 is described as a representative of both the cutting systems.

The second cutting system 93 includes the circular saw machine 931 serving as the cutting device, a long product stocker 933, an unloading slider 935, a cut member processing device 7, a robot hand device 8, a short product stocker 934, and a system control device 936.

The circular saw machine 931 cuts the long workpiece W2 supplied from the shelf device 91 via the second relay conveyor 62 into a predetermined length. In this manner, a cut member P1 is obtained. The cut member P1 is a member that will become a product P2 after putting thereon an after-mentioned mark M, and is hereinafter also referred to as an intermediate product P1. The unloading slider 935 includes a base 935*a* and a clamper 935*b*. The base 935*a* comes in and out in the front-rear direction with respect to the circular saw machine 931, as indicated by an arrow DR3. The unloading slider 935 grips the intermediate product P1, which is cut by the circular saw machine 931, by the clamper 935*b*, and moves to the front side.

The robot hand device 8 includes a base portion 81, a base body portion 82, an arm portion 83, and a gripping portion 84. The base portion 81 is a guide member extending in the front-rear direction, and includes a drive unit (not illustrated in the drawings) in its inside. The base body portion 82 is supported by the base portion 81, and moves in the front-rear direction by the operation of the drive unit (see an arrow DR4). The arm portion 83 extends upward from the base body portion 82. The arm portion 83 is a multi-degree-of-freedom robot hand having multiple joints. The gripping portion 84 that can grip the intermediate product P1 is mounted at a distal end of the arm portion 83.

The cut member processing device 7 and the short product stocker 934 are disposed on the left side of the base portion 81 in this order from the rear side. The long product stocker 933 is disposed on the front right side of the base portion 81.

The robot hand device 8 grips the intermediate product P1 unloaded by the unloading slider 935 and changes its posture by, for example, turning as indicated by an arrow DR5 to load it into the cut member processing device 7. Further, the robot hand device 8 grips the product P2 processed by the cut member processing device 7, such as marking thereon, to transports it to the short product stocker 934.

The cut member processing device 7 puts a mark M (see FIG. 3) on the intermediate product P1. The cut member processing device 7 measures a product length HaP (see FIG. 6) by measuring an axial length of the intermediate product P1. The cut member processing device 7 has a box-shaped cover 71. An opening/closing door 711 is provided on an upper right face of the cover 71. The robot hand device 8 loads the intermediate product P1 through a loading/unloading port 711*a* opened when the opening/closing door 711 is open. The robot hand device 8 unloads the product P2, on which the mark M has been put and thus which becomes visually distinguishable, through the loading/unloading port 711*a* opened when the opening/closing door 711 is open.

Figure 3:
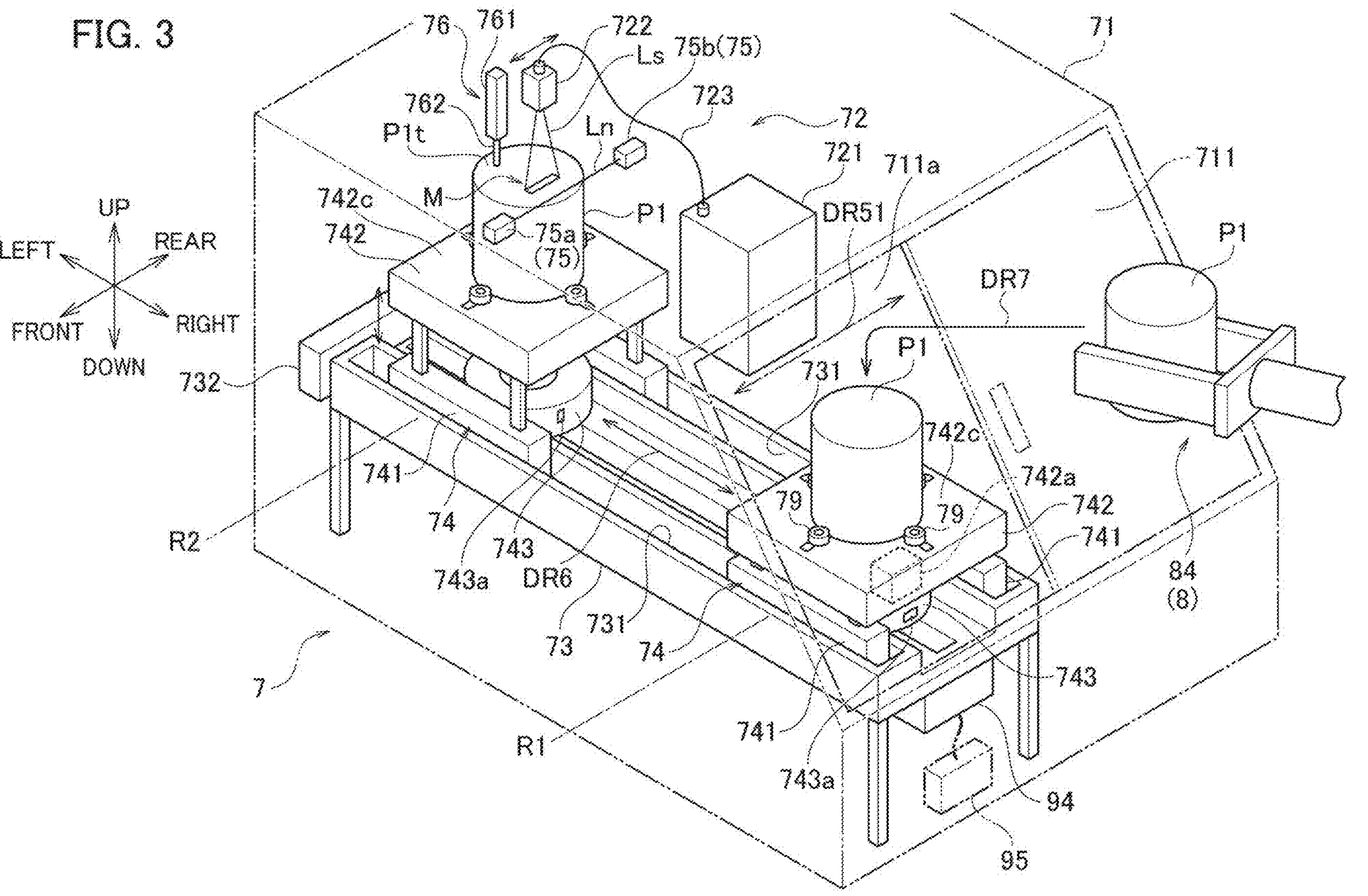
FIG. 3 is a schematic perspective view illustrating a cut member processing device 7 according to the one embodiment.
Figure 6:
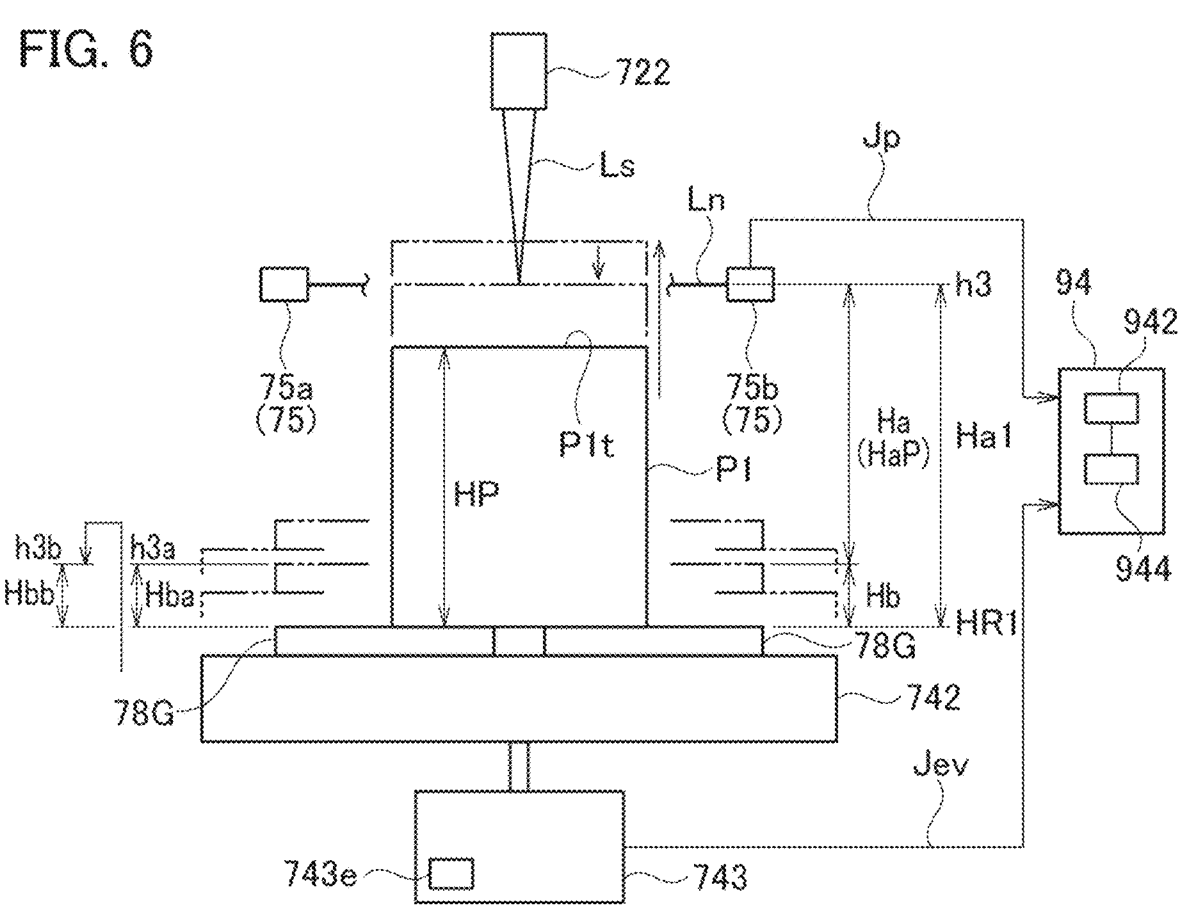
FIG. 6 is an explanatory view illustrating a first length measuring operation in the cut member processing device 7 according to the one embodiment.

With reference to FIG. 3 to FIG. 6, the configuration of the cut member processing device 7 is described. FIG. 3 is a schematic perspective view illustrating the cut member processing device 7 according to the one embodiment. In order to illustrate its internal structure, the outer shape of the cover 71 is indicated by the long dashed double-short dashed line. For the sake of convenience of description, the up, down, left, right, front, and back directions are defined as the directions indicated by the arrows, respectively. Those directions correspond to the directions defined in FIG. 1. FIG. 4A is a top view of a table main body 742 included in the cut member processing device 7. FIG. 4B is a cross-sectional view taken along a line S4B-S4B in FIG. 4A. FIG. 4C is a top view illustrating a state where the intermediate product P1 is clamped on the table main body 742. In FIG. 4C, the intermediate product P1 is indicated by the long dashed double-short dashed line. FIG. 5 is a block diagram illustrating the configuration of the cut member processing device 7. FIG. 6 is an explanatory diagram illustrating a first length measuring operation in the cut member processing device 7.

As illustrated in FIG. 3, the cut member processing device 7 includes the cover 71, a laser marker device 72, a base unit 73, a table unit 74, an optical sensor device 75, a cylinder measurement unit 76, and a control device 94. As illustrated in FIG. 5, the control device 94 includes a central processing unit (CPU) 941, a product length acquisition unit 942, a pass/fail judgement unit 943, a storage unit 944, and a marking control unit 945.

As illustrated in FIG. 3, the cover 71 is formed to have a box shape, and its upper right portion has a sloped shape sloping upward toward the left. The opening/closing door 711 configured to move in the front-rear direction as indicated by an arrow DR51 is provided at the upper right portion, and the loading/unloading port 711*a* is open as an opening when the opening/closing door 711 is moved rearward.

The base unit 73 is installed inside the cover 71 with its long side extending in the right-left direction. The base unit 73 includes a pair of guide rail portions 731 provided on respective front and rear edges extending to the right and left sides and a table horizontal drive unit 732 configured to move sliders 741 engaged with the guide rail portions 731 in the right-left direction.

The table unit 74 includes the pair of sliders 741, the table main body 742, and a table elevating drive unit 743. The table elevating drive unit 743 includes an elevation encoder 743*a*. The pair of sliders 741 are respectively engaged with the pair of guide rail portions 731 of the base unit 73 as described above, and move in synchronization with each other in the right-left direction as indicated by an arrow DR6 through the operation of the table horizontal drive unit 732. The operation of the table horizontal drive unit 732 is controlled by the control device 94 (see FIG. 5).

The table main body 742 has a square plate shape in top view. The table main body 742 is supported by the pair of sliders 741 so as to be positioned above the sliders 741. Plural product clampers 79 and plural ball transfer groups 78G (see FIG. 4A) are provided on an upper surface 742*c* of the table main body 742. Each of the ball transfer groups 78G is a group in which plural ball transfers 78 are arranged to be aligned in line.

Figure 4A:
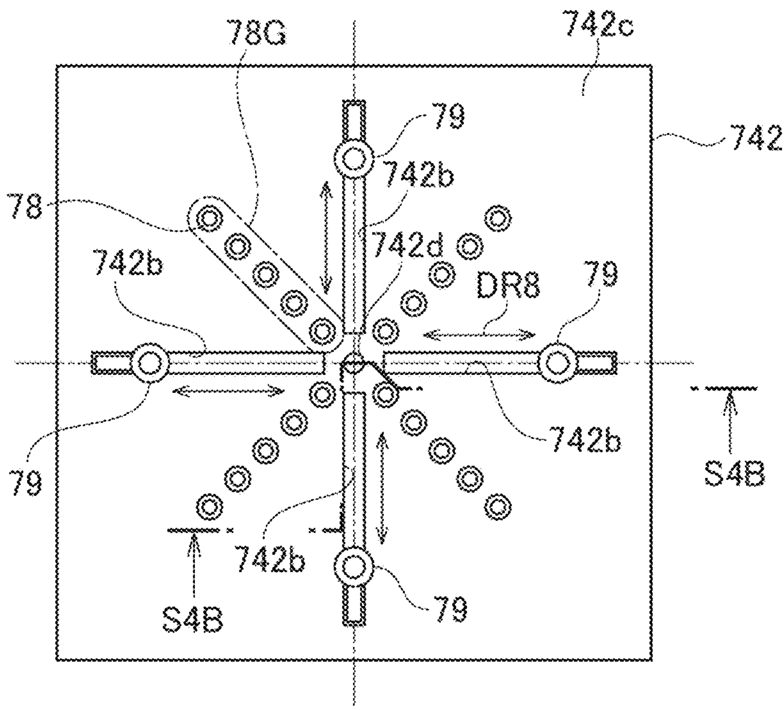
FIG. 4A is a top view of a table main body 742 included in the cut member processing device 7 according to the one embodiment.
Figure 4B:
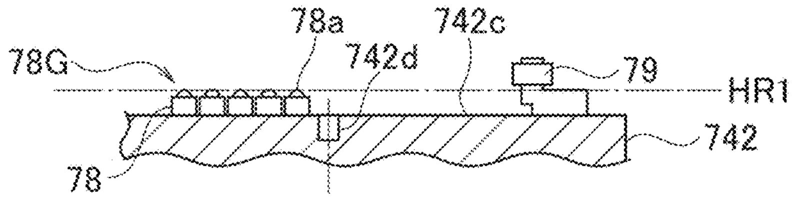
FIG. 4B is a cross-sectional view taken along a line S4B-S4B in FIG. 4A.

The intermediate product P1 is placed on the ball transfer groups 78G by the robot hand device 8. As illustrated in FIG. 4A and FIG. 4B, a table sensor 742*d* is installed at a center portion of the table main body 742. The table sensor 742*d* outputs placement detection information Jt, which indicates whether or not an object is placed on the ball transfer groups 78G, to the control device 94.

With the above-mentioned configuration, the table main body 742 moves between a loading/unloading position R1 on the right end portion side of the guide rail portions 731 and a processing position R2 on the left end portion side thereof. In FIG. 3, the table unit 74 is illustrated by the solid lines in a state of being positioned at each of the loading/unloading position R1 and the processing position R2.

The table main body 742 is moved upward and downward with respect to the sliders 741 through an elevating operation of the table elevating drive unit 743. In FIG. 3, the table unit 74 located at the loading/unloading position R1 is illustrated in a state of being present at the lowest position of an elevating range, and the table unit 74 located at the processing position R2 is illustrated in a state in which the table main body 742 is moved upward by a certain distance. The table elevating drive unit 743 includes the elevation encoder 743*a* configured to output a displacement in the up-down direction of the table main body 742 as vertical movement information Jev to the control device 94.

The intermediate product P1 carried by the gripping portion 84 of the robot hand device 8 as indicated by an arrow DR7 is placed on the ball transfer groups 78G on the upper surface 742*c* of the table main body 742 (see FIG. 3).

As illustrated in FIG. 4A and FIG. 4B, a total of four ball transfer groups 78G are disposed on the upper surface 742*c* of the table main body 742 on radial lines passing through the center with an angular pitch of 90°. Each of the ball transfer groups 78G includes, for example, five ball transfers 78 radially aligned so as to be faced upward. As illustrated in FIG. 4B, upper distal end points 78*a* of the ball transfers 78 are positioned at a reference height position HR1, i.e., at the same horizontal height.

On the upper surface 742*c* of the table main body 742, four guide grooves 742*b* extending in the radial direction are formed at an angular pitch of 90° while being shifted from the ball transfer groups 78G by an angular pitch of 45°. The product clampers 79 each including a freely rotatable roller having a rotary axis extending in the up-down direction are engaged with the guide grooves 742*b*. The product clampers 79 are moved in the radial directions as indicated by arrows DR8 in the guide grooves 742*b*, respectively, by a clamp drive unit 742*a* (see FIG. 4A).

Figure 4C:
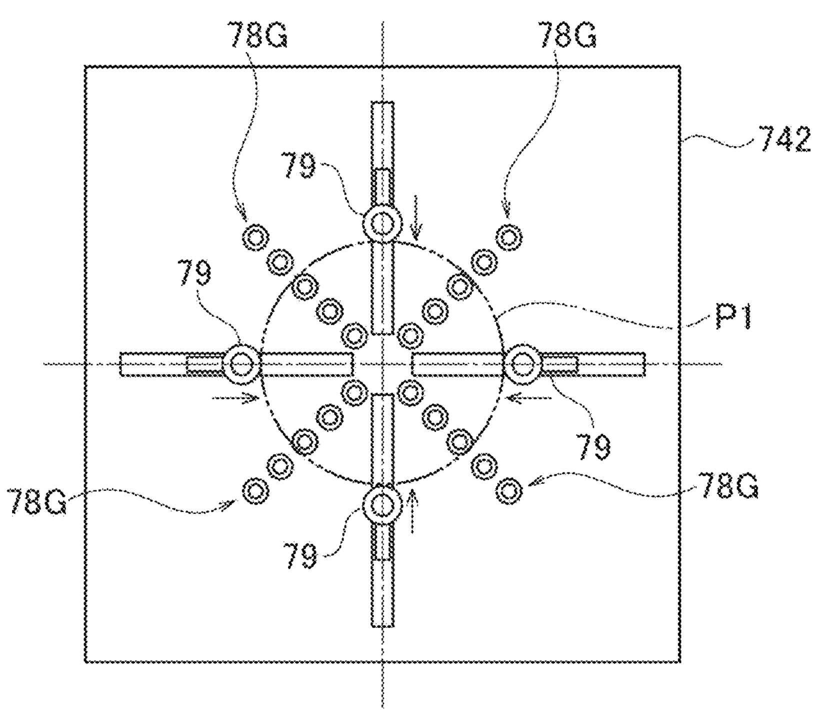
FIG. 4C is a top view illustrating a state where a cut member P1 is clamped on the table main body 742.

As illustrated in FIG. 4C, when the intermediate product P1 is placed on the table main body 742, the intermediate product P1 is supported by the distal end points 78*a* of the ball transfer groups 78G. That is, a bottom surface of the intermediate product P1 is positioned at the reference height position HR1. The table sensor 742*d* outputs the placement detection information Jt, which indicates that an object (intermediate product P1) has been placed on the table main body 742, to the control device 94 (see FIG. 5). The CPU 941 of the control device 94 operates the clamp drive unit 742*a* to move the four product clampers 79 toward the center of the table main body 742 to clamp the intermediate product P1.

As illustrated in FIG. 3, the optical sensor device 75 is a device configured to emit and receive a light beam Ln such as infrared light. Specifically, the optical sensor device 75 includes a set of a light emitting portion 75*a* configured to emit the light beam Ln horizontally, and a light receiving portion 75*b* configured to receive the light beam Ln. The light beam Ln is positioned just above the intermediate product P1 placed on the table main body 742 at the time when the table unit 74 is located at the processing position R2. In other words, the light beam Ln is emitted at a position that it may be blocked by the intermediate product P1 when the table main body 742 on which the intermediate product P1 is placed moves upward, that is, at a position where the light beam Ln may be cutoff.

As illustrated in FIG. 6, the product length acquisition unit 942 of the control device 94 always acquires a distance Ha1 in a height direction between a fixed height position h3 of the light beam Ln and the reference height position HR1 of the ball transfer groups 78G of the table main body 742, based on the vertical movement information Jev from the elevation encoder 743*a*.

The storage unit 944 stores, as the reference height distance Ha1, a distance in the up-down direction between the reference height position HR1, which is the lowest height position at the lowest position of the elevating of the table main body 742, and the height position h3 of the light beam Ln.

As illustrated in FIG. 3, the laser marker device 72 serving as a marking device includes a laser oscillator 721, a laser output head 722, and a process fiber 723 connecting the laser oscillator 721 with the laser output head 722. The laser output head 722 is installed above the intermediate product P1 at the time when the table unit 74 is located at the processing position R2 so as to be movable in the front-rear direction. The laser output head 722 outputs a laser beam Ls downward. The laser beam Ls is adjusted to be focused at the height position of the light beam Ln.

The laser beam Ls is deflected by an optical system (not illustrated in the drawings) and is applied to a metal surface so as to be focused thereon, such that a visually recognizable mark M such as desired characters or a figure can be put thereon. That is, the laser beam Ls can mark the metal surface located at the height position of the light beam Ln.

The cylinder measurement unit 76 is disposed above the intermediate product P1 at the time when the table unit 74 is located at the processing position R2. The cylinder measurement unit 76 includes a main body portion 761, and a measuring contact 762, which is a rod protruded downward from the main body portion 761 and retracted therein, and a signal corresponding to a downward protrusion of the measuring contact 762 is output as cylinder distance-measurement information Jm (see FIG. 5).

Figure 7:
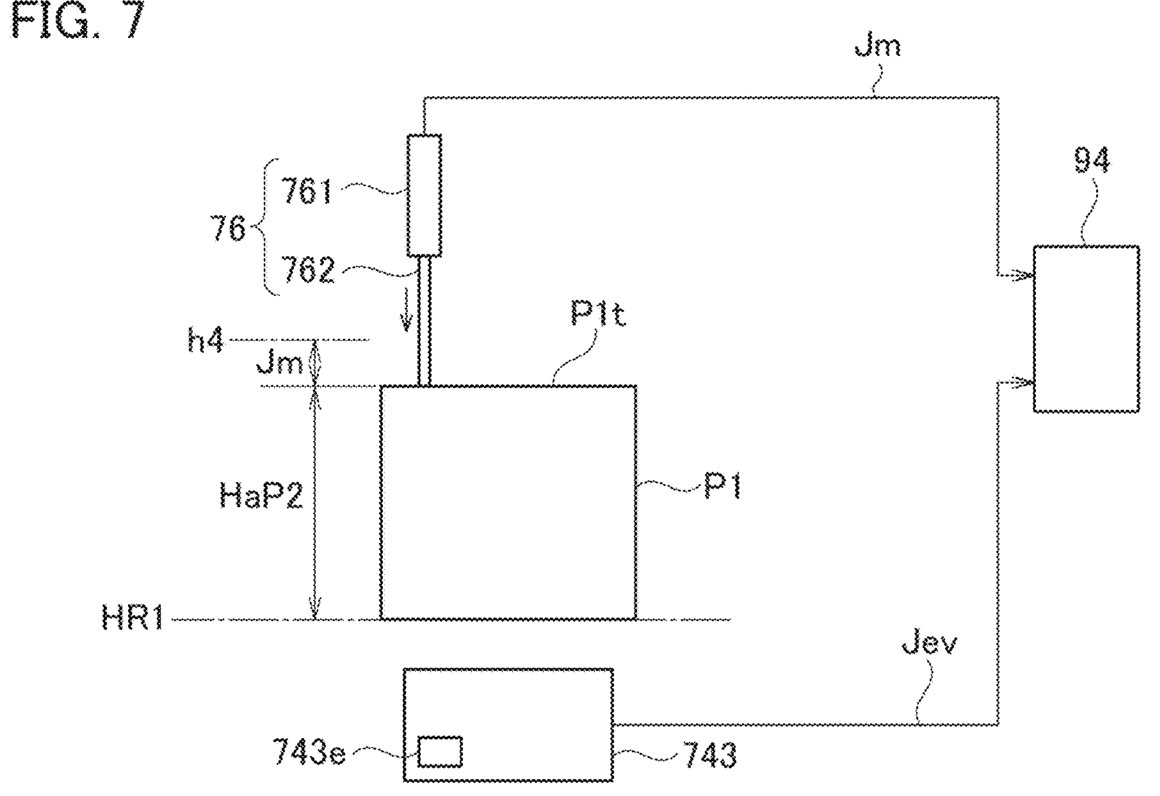
FIG. 7 is an explanatory view illustrating a second length measuring operation in the cut member processing device 7 according to the one embodiment.

FIG. 7 is an explanatory view illustrating measurement of the product length of the intermediate product P1 performed by the cylinder measurement unit 76. As illustrated in FIG. 7, the measuring contact 762 is protruded downward from the main body portion 761 to be brought into abutment against a cut surface P1*t* of the intermediate product P1. A downward protrusion from an upper limit position h4 of the measuring contact 762 at this time is output as the cylinder distance-measurement information Jm to the control device 94. That is, the product length is measured based on the cylinder distance-measurement information Jm.

Figure 8:
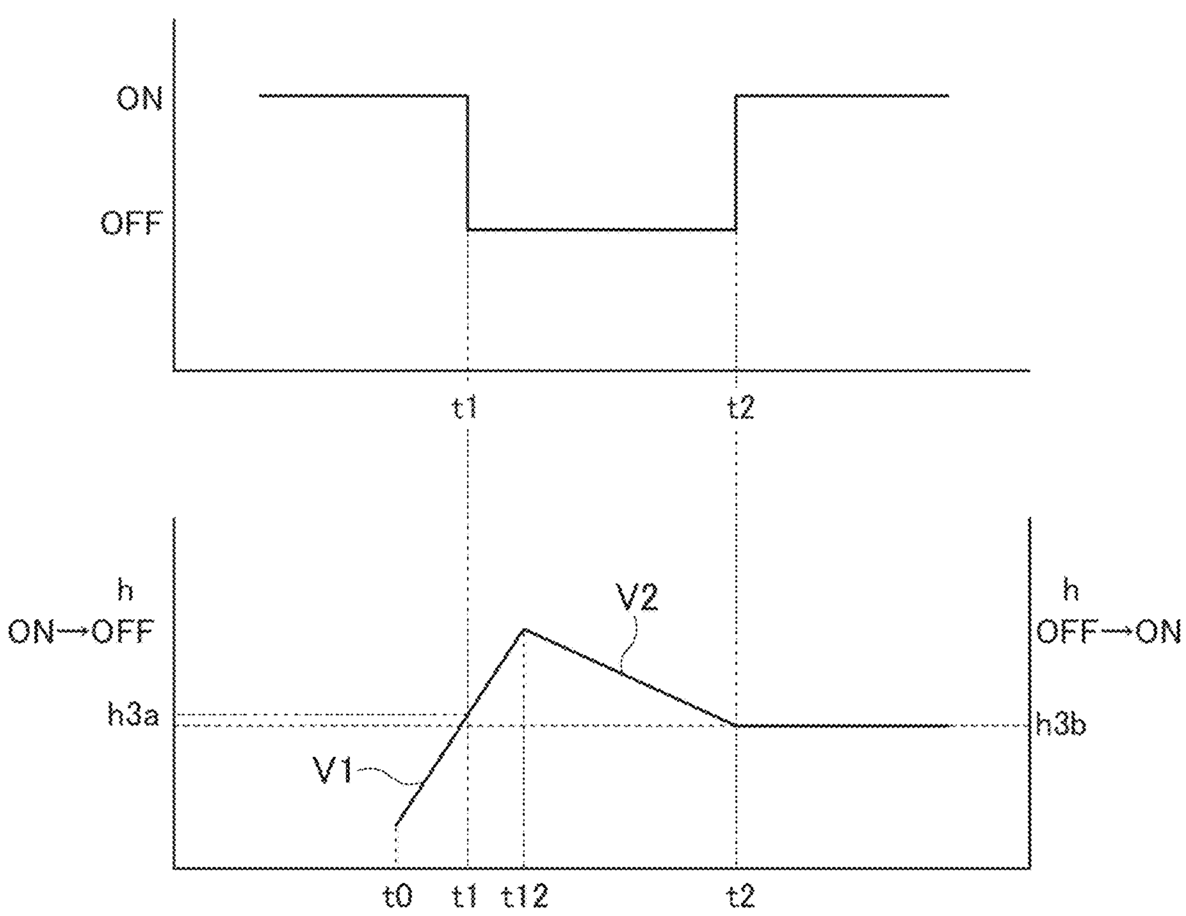
FIG. 8 is an explanatory graph of an operation of an optical sensor device 75 in the first length measuring operation in the cut member processing device 7 according to the one embodiment.
Figure 9A:
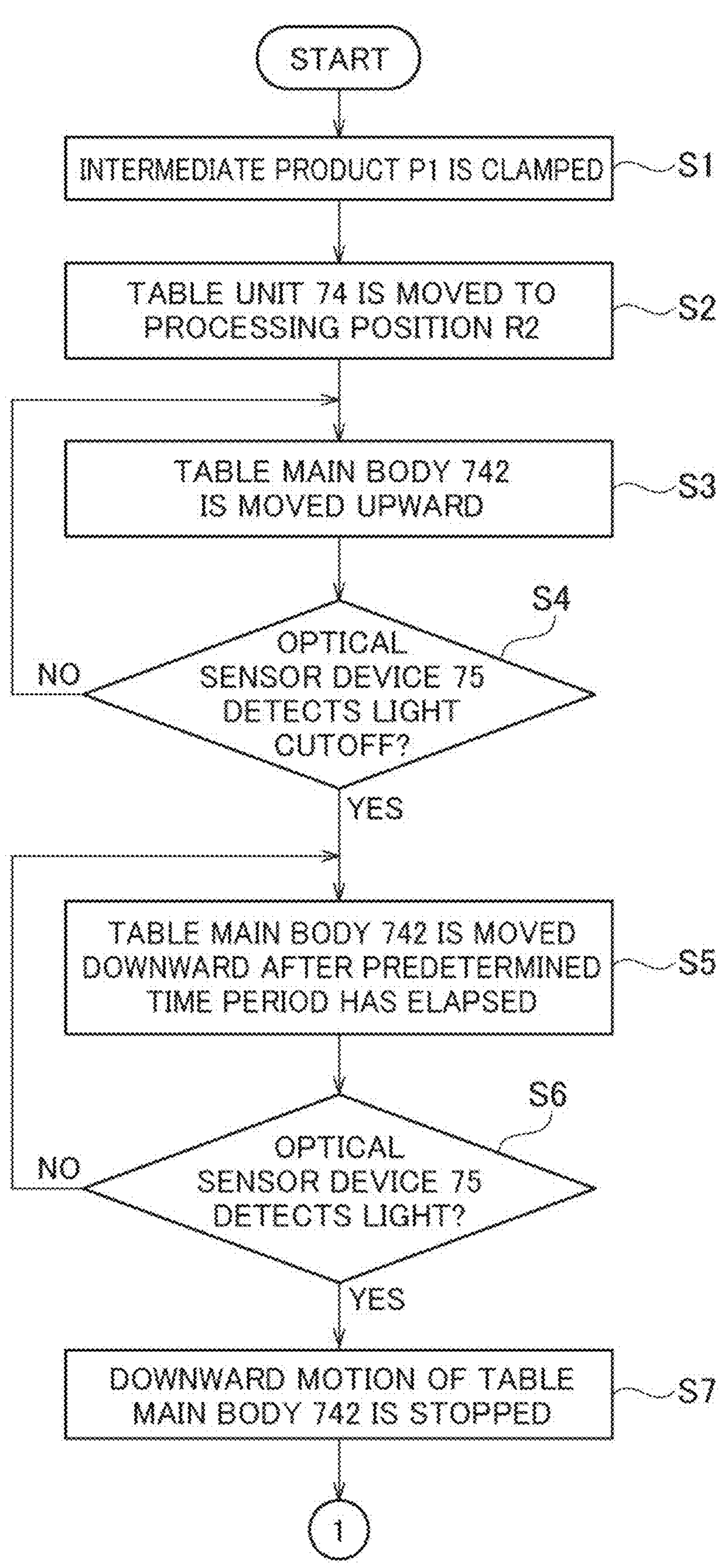
FIG. 9A is a flow chart illustrating a first part of the operation of the cut member processing device 7 according to the one embodiment.

In the above-mentioned configuration, the control device 94 controls the operation of the cut member processing device 7. The cut member processing device 7 can put the mark M on the cut surface P1*t* of the intermediate product P1 using the laser beam Ls, and can also measure the product length that is the axial length of the intermediate product P1 at the same time. The operation of the cut member processing device 7 is hereinafter described in detail with reference to FIG. 8, FIG. 9A, and FIG. 9B. FIG. 8 is an explanatory graph of the operation of the optical sensor device 75 in a first length measuring operation in the cut member processing device 7. FIG. 9A is a flow chart illustrating a first part of the operation of the cut member processing device 7.

Figure 9B:
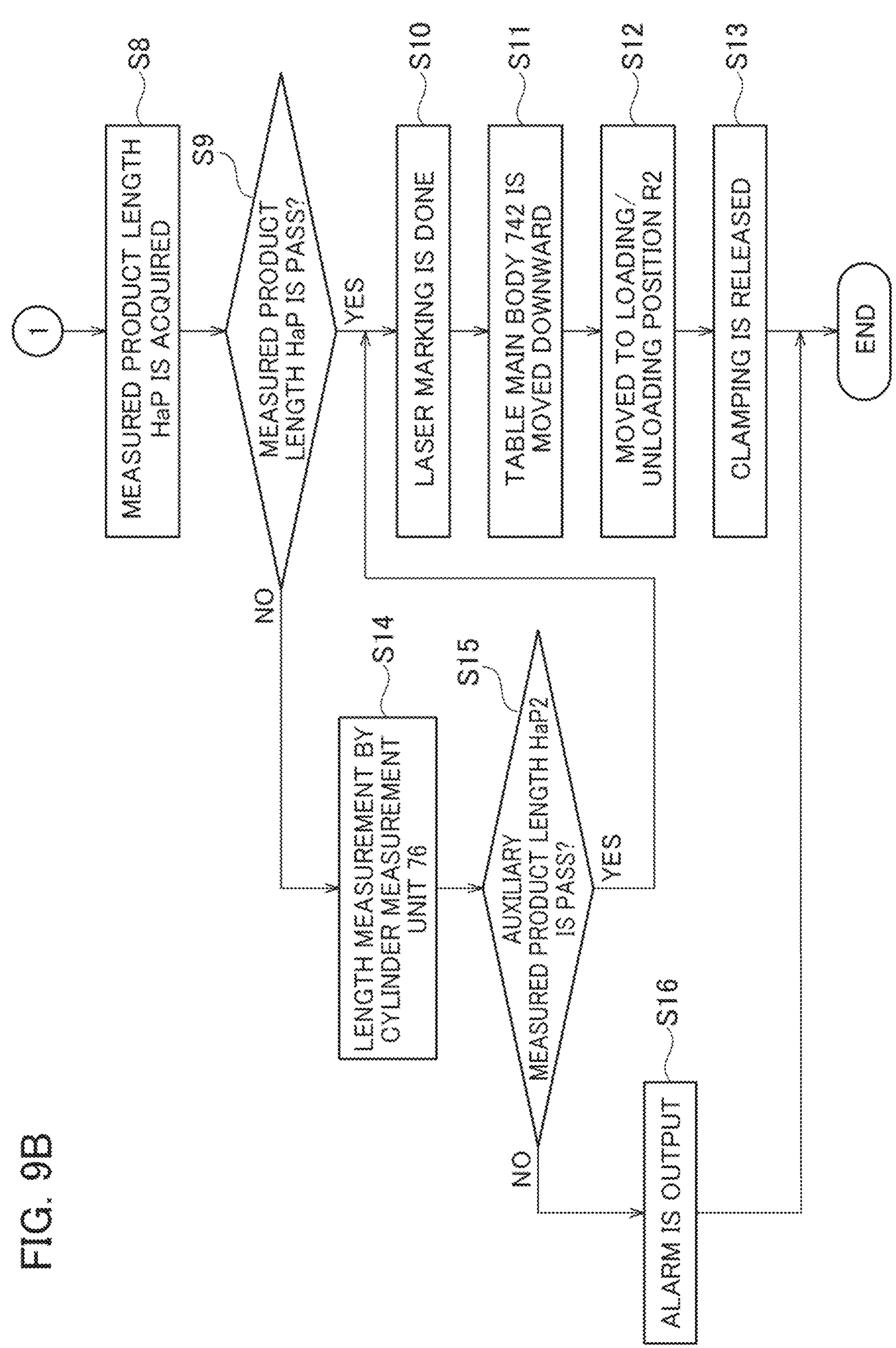
FIG. 9B is a flow chart illustrating a latter part of the operation of the cut member processing device 7 according to the one embodiment.

FIG. 9B is a flow chart illustrating a latter part of the operation of the cut member processing device 7.

As illustrated in FIG. 3, as an initial state, the control device 94 moves in advance the table unit 74 to the loading/unloading position R1. As the initial state, the control device 94 sets in advance the table main body 742 at the lowest position of the elevating stroke. The product length acquisition unit 942 of the control device 94 stores in advance the vertical movement information Jev output from the elevation encoder 743*a* at the time when the table main body 742 is located at the lowest position of the elevating stroke in the storage unit 944. The optical sensor device 75 is in a light receiving state (ON).

First, the opening/closing door 711 is opened so that the loading/unloading port 711*a* is made open. Then, the robot hand device 8 changes the posture of the intermediate product P1 gripped by its gripping portion 84 so that its axis is oriented in the up-down direction, and places it on the ball transfer groups 78G (see FIG. 4C) of the table main body 742 through the loading/unloading port 711*a*. After that, the opening/closing door 711 is closed after the gripping portion 84 is retreated through the loading/unloading port 711*a*. The inside of the cover 71 is substantially brought into a sealed state.

The table sensor 742*d* of the table main body 742 detects that the intermediate product P1 has been placed on the ball transfer groups 78G, and outputs the detection result as the placement detection information Jt to the control device 94.

The control device 94 receives the placement detection information Jt, and recognizes that the intermediate product P1 has been placed on the ball transfer groups 78G. When the control device 94 recognizes that the intermediate product P1 has been placed on the ball transfer groups 78G, it operates the clamp drive unit 742*a* to move the four product clampers 79 toward the center of the table main body 742. In this manner, the product clampers 79 clamp the intermediate product P1 (S1).

Next, the control device 94 moves the table unit 74 from the loading/unloading position R1 to the processing position R2 (S2). Next, the control device 94 operates the table elevating drive unit 743 to move the table main body 742 upward at a first speed V1 from a time t0 (FIG. 8: time t0<t<t1) (S3).

The control device 94 always monitors optical sensor information Jp from the optical sensor device 75, and determines whether or not the optical sensor information Jp has changed to OFF (S4). When the control device 94 determines that the optical sensor information Jp is ON (S4: NO) (state of receiving the light beam Ln), it returns to Step S3 to continue to move the table main body 742 upward. As illustrated in FIG. 8, when the table main body 742 moves upward by a certain distance from the position at the time t0, the intermediate product P1 blocks the light beam Ln at the time t1, and the optical sensor information Jp changes to OFF (S4: YES) (cutoff state of the light beam Ln). That is, the height position of the cut surface P1*t* when the light beam Ln of the optical sensor device 75 changes from the light receiving state to the light cutoff state, is denoted as h3*a*, and thus a moving distance Hba from the reference height position HR1 that is the lowest height position of the table main body 742 can be calculated (see FIG. 6 and FIG. 8).

When the control device 94 makes a judgement as YES in Step S4, it moves the table main body 742 downward at a second speed V2 from a time t12 after a predetermined time has elapsed from the time t1 (S5). The second speed V2 is the same speed as the first speed V1 or a speed smaller than the first speed V1. That is, the second speed V2 is a speed at which a time lag required until the central processing unit (CPU) 941 can process the sensor signal so as to be suitable for measuring the product length can be ignored and the table main body 742 can be immediately stopped.

The control device 94 judges whether or not the optical sensor information Jp from the optical sensor device 75 has changed to ON again (S6). When the control device 94 judges that the optical sensor information Jp is still OFF (S6: NO) (cutoff state of the light beam Ln), it returns to Step S5 to continue to move the table main body 742 downward. When the control device 94 judges that the optical sensor information Jp has changed to ON (receiving state of the light beam Ln) (S6: YES), it immediately stops the downward motion of the table main body 742 and keeps it at that position (S7). That is, the height position of the cut surface when the light beam Ln of the optical sensor device 75 changes from the light cutoff state to the light receiving state is denoted as h3*b*, a moving distance Hbb from the reference height position HR1 of the table main body 742 can be calculated (see FIG. 6 and FIG. 8). In this manner, a distance Hb that is the moving distance of the table main body 742 can be calculated. By setting the second speed V2 for the downward motion of the table main body 742 slower (smaller) than the first speed V1 for the upward motion of the table main body 742, the distance Hb indicating the moved distance of the table main body 742 can be obtained with a higher accuracy.

As illustrated in FIG. 6, the product length HaP is measured as a distance Ha obtained by subtracting the distance Hb indicated the moved distance of the table main body 742 from the reference height distance Ha1. The distance Hb can also be calculated by using the moving distance Hba obtained while the table main body 742 is moved upward at the speed V1, but it is better to calculate by using the moving distance Hbb obtained during its downward motion at the lower speed V2 than the speed for the moving distance Hba, because a waste running distance required for stopping the table main body 742 can be shortened and the accuracy of the measured value in the same control period can be improved.

The product length acquisition unit 942 of the control device 94 acquires the distance Ha in this state as the product length HaP of the intermediate product P1 (S8), and stores the product length HaP in the storage unit 944. Next, the pass/fail judgement unit 943 of the control device 94 compares the product length HaP with an allowable product length range HaPA preliminarily stored in the storage unit 944 as illustrated in FIG. 5, and judges pass/fail of the product length HaP (S9). The allowable product length range HaPA is a preset passing range of the product length HaP of the intermediate product P1.

As a case in which the pass/fail judgement unit 943 makes a judgement as fail (NO) in Step S9, a case in which the optical sensor device 75 fails to operate will be described below. For example, this case include a case in which the optical sensor information Jp is always in the light cutoff state or always in the light receiving state and a case in which the optical sensor device 75 stops its operation. In those cases, although not illustrated, when the table main body 742 is moved upward while the intermediate product P1 having the maximum product length is placed on the table main body 742, the upward motion of the table main body 742 will be made stopped at a position with which it doesn't interfere with the light beam Ln of the optical sensor device 75 nor contact with the cylinder measurement unit 76, and thus the height position h3*a* of the cut surface P1*t* and the height position h3*b* of the cut surface P1*t* are undefined.

Further, as another example, there is a case in which a signal serving as a source of the optical sensor information Jp is unstable, and thus the light cutoff state and the light receiving state cannot be correctly measured. In this case, there is a possibility that the height position h3*a* of the cut surface Pt and the height position h3*b* of the cut surface P1*t* can be measured, but even if those height positions can be measured, the product length measured based on those height positions may become a value different from the preset product length HaP of the intermediate product P1.

When the above-mentioned pass/fail judgement unit 943 makes a judgement as fail (NO) in Step S9, the product length acquisition unit 942 executes measurement by the cylinder measurement unit 76, which serve as a measuring device, as an auxiliary second length measuring operation. That is, an auxiliary product length HaP2 of the intermediate product P1 is acquired through measurement by the cylinder measurement unit 76 (S14).

Specifically, the control device 94 moves the table main body 742 downward to return it to the reference height position HR1. Next, the product length acquisition unit 942 extends the measuring contact 762, which is the rod of the cylinder measurement unit 76, downward to contact it directly with the cut surface P1*t* of the intermediate product P1 to measure the distance (S14) (see FIG. 7). The cylinder measurement unit 76 outputs the cylinder distance-measurement information Jm corresponding to the downward distance of the measuring contact 762 as a measurement result, and hence the product length acquisition unit 942 obtains the product length of the intermediate product P1 as the auxiliary product length HaP2 based on a relationship among the upper limit position h4 of the measuring contact 762 and the height position h3, which have been preliminarily stored in the storage unit 944, and the cylinder distance-measurement information Jm and the reference height distance Ha1.

The pass/fail judgement unit 943 compares the obtained auxiliary product length HaP2 with the allowable product length range HaPA to judge pass/fail of the product length of the intermediate product P1 (S15). When the pass/fail judgement unit 943 makes a judgement as fail (NO) in Step S15, it determines that an abnormality has occurred and the output device 95 (see FIG. 3) outputs an alarm (S16). Then, the pass/fail judgement unit 943 stops the operation of the cut member processing device 7.

When the pass/fail judgement unit 943 makes a judgement as pass in Step S15 or makes a judgement as pass in Step S9, the marking control unit 945 executes a marking operation by the laser marker device 72 (S10).

In the marking operation, under the control of the marking control unit 945, the laser oscillator 721 generates a laser beam, and the generated laser beam is supplied to the laser output head 722 through the process fiber 723. The marking control unit 945 emits the supplied laser beam as the laser beam Ls with a predetermined power downward from the laser output head 722. As described above, the laser beam Ls is adjusted so that its focal position becomes the height position of the light beam Ln. The intermediate product P1 whose downward motion is stopped and kept in Step S7 has its upper surface, i.e., the cut surface P1*t*, located at the height of the focal position of the laser beam Ls. That is, when the pass/fail judgement unit 943 judges the product length as pass (YES) in Step S9, the marking control unit 945 can perform the marking operation without moving the table main body 742 upward or downward. Even when the pass/fail judgement unit 943 judges the product length as fail (NO) in Step S9, the cut surface P1*t* is already set at a position suitable to the marking operation, and hence the marking control unit 945 can perform the marking operation at this timing. In other words, the marking control unit 945 can perform the marking operation at the time of completion of Step S7. In this manner, the mark M can be put on the cut surface P1*t* by the laser beam Ls.

The mark M to be put is characters, a figure, or the like, and is a preset mark M preliminarily linked with the intermediate product P1 and stored in the storage unit 944. The marking control unit 945 acquires the mark M linked with the intermediate product P1 from the storage unit 944, and puts the mark M on the cut surface P1*t* through the deflection operation in the right-left direction of the optical system (not illustrated in the drawings) in the laser output head 722 and the motion in the front-rear direction of the laser output head 722. When the mark M has been put on the cut surface P1*t*, the intermediate product P1 becomes the product P2 that is a completed cut product.

After the laser marking of Step S10 is ended, the control device 94 moves the table main body 742 downward to the lowermost position of the elevating range (S11). Subsequently, the control device 94 moves the table unit 74 from the processing position R2 to the loading/unloading position R1 (S12). Then, the control device 94 moves the product clampers 79 outward to release the clamping of the product P2 (S13). In this manner, the robot hand device 8 can unload the product P2 to the outside.

And then, the robot hand device 8 grips the product P2 to unload the product P2 from the cut member processing device 7 to reload it to the short product stocker 934. A long product that cannot be processed by the cut member processing device 7 is stored directly to the long product stocker 933 from the circular saw machine 931.

In the above-mentioned method, the marking is executed serially on the intermediate product P1 after its product length is judged as pass. However, as the procedure, after the downward motion of the table main body 742 is stopped and its position is kept in Step S7, the marking operation may be started in parallel without waiting for the pass/fail result. The time required for the pass/fail judgement is extremely shorter than the time required for the marking operation, and the difference in production time of the product P2 between the serial and parallel procedures is negligible. That is, the cut member processing device 7 can perform the marking operation without moving the table main body 742 upward or downward again the normal operation in which no auxiliary second length measuring operation is performed (at the normal operation in which the pass/fail judgement unit 943 does not make the fail judgement (NO) in Step S9). In this manner, the cut member processing device 7 can shorten the production time of the product P2 by sharing the measuring time and the marking positioning time in the length measuring step and the marking positioning step.

As described above, the cut member processing device 7 according to an aspect of the present invention includes: the marking device 72 configured to put the mark M on the cut surface P1*t* of the cut member P1 cut out from the metal long workpiece W2 by the cutting device 931; and the product length acquisition unit 942 configured to measure and store the product length HaP of the cut member P1, in which the product length acquisition unit 942 is configured to measure the product length HaP under a state in which the cut member P1 is located at a position that allows the marking device 72 to put the mark M on the cut surface P1*t*.

In this manner, in the cut member processing device 7, no time is required to move the cut member P1 between individual devices to measure the product length HaP, and also no time is required only for length measurement. In this manner, the productivity of the product P2 having the mark M put thereon can be improved. Further, the device configured to put the mark and the device configured to measure the product length are integrated, and hence the space is saved.

Further, the cut member processing device 7 may further include: the table main body 742 that is moved upward and downward and on which the cut member P1 is to be placed; and the optical sensor device 75 configured to emit and receive the light beam Ln horizontally at the predetermined height position h3 above the table main body 742, wherein the marking device may be configured to put the mark M on the cut surface P1*t* located at the predetermined height position h3 by outputting, from the upper side, the laser beam Ls having the predetermined height position h3 as the focal point position, and wherein the product length acquisition unit 942 may be configured to acquire the product length HaP of the cut member P1 at a position corresponding to the predetermined height position at which the cut member P1 transitions from a state of not receiving the light beam Ln to a light receiving state through the elevating operation of the table main body 742 on which the cut member P1 is placed.

With the measurement of the product length and the elevating operation of the table main body 742 required for the marking operation being shared, the cut member processing device 7 can be improved in productivity of the product P2 having the mark M put thereon, and can acquire the product length HaP of the cut member P1 with a high accuracy.

Further, the cut member processing device 7 may further include the pass/fail judgement unit 943 configured to judge pass or fail by comparing the product length HaP acquired by the product length acquisition unit 942 with the allowable product length range HaPA indicating an allowable range of the product length.

In this manner, the cut member processing device 7 can be improved in productivity of the product P2 having the mark M put thereon, and can judge pass or fail of the product length HaP of the product P2.

Further, in the cut member processing device 7, when the pass/fail judgement unit 943 judges the product length HaP as fail, the product length acquisition unit 942 may acquire, as the auxiliary product length HaP2, the product length HaP of the cut member P1 based on the measurement result of the measuring device 76 configured to contact the measuring contact 762 directly with the cut surface P1*t*.

In this manner, the cut member processing device 7 can continue production by measuring the length by the measuring contact 762 when the length measurement using the light beam Ln fails for some reasons such as device failure, and can prevent the productivity from being extremely reduced.

Further, the cut member processing device 7 may further include a mass sensor 77 capable of measuring the mass of the cut member P1 under the state in which the cut member P1 is located at the position that allows the marking device 72 to put the mark M on the cut surface P1*t*.

In this manner, the cut member processing device 7 can not only put the mark M on the cut surface P1*t* of the cut member P1 and acquire the product length HaP, but can also acquire the mass without requiring time, and thus the productivity is further improved.

The cutting system 93 according to an aspect of the present invention includes: the cutting device 931 configured to cut out the cut member from the metal long workpiece; the cut member processing device 7 provided with the marking device 72 configured to put the mark M on the cut surface P1*t* of the cut member P1 and the product length acquisition unit 942 configured to acquire the product length HaP of the cut member P1, the product length acquisition unit 942 being configured to acquire the product length HaP under a state where the cut member P1 is located at a position that allows the marking device 72 to put the mark M on the cut surface P1*t*; and the robot hand device 8 configured to load the cut member P1 cut out by the cutting device 931 into the cut member processing device 7.

In this manner, in the cutting system 93, no time is required to move the cut member P1 between individual devices to measure the product length HaP, and also no time is required only for length measurement. Further, the cut member P1 can be automatically conveyed from the cutting device 931 to the cut member processing device 7, and hence the productivity of the product P2 having the mark M put thereon can be improved. Further, the device configured to put a mark and the device configured to measure the product length are integrated, and hence the space can be saved.

The cut member processing device 7 serving as the marking device configured to put the mark M can perform, in addition to the length measurement using a non-contact operation with the light beam Ln, the length measurement using a contact operation of the measuring contact 762 by the cylinder measurement unit 76. Accordingly, when the length measurement using the light beam Ln fails for some reasons such as device failure, production can be continued by measuring the length by the measuring contact 762, and thus the productivity can be prevented from being extremely reduced.

By setting the second speed V2 for the downward motion slower than the first speed V1 for the upward motion in the length measuring operation for the intermediate product P1 illustrated in FIG. 8, the height position h3*b* of the intermediate product P1 can be positioned with a high accuracy when the optical sensor information Jp changes to ON again.

The embodiments of the present invention are not limited to the above-mentioned configurations, and modification examples may be given without departing from the gist of the present invention.

The table unit 74 may include the mass sensor 77 (see FIG. 5) configured to measure the mass of the object placed on the table main body 742. The mass sensor 77 measures the mass of the placed intermediate product P1, and sends the measured mass as mass information Jw to the control device 94. In this manner, the mass of the intermediate product P1 can also be measured during the marking operation, and the productivity of the product P2 being the product of the cut member P1 can be more improved.

The control device 94 may include a cutting compensation value acquisition unit, and may control the circular saw machine 931 serving as the cutting device to compensate the cutting position based on a long/short tendency with respect to the product length HP of the product length HaP. For example, when the product length HaP tends to be longer than the product length HP, the cutting position of the workpiece W2 is compensated so that the product is to be cut out slightly shorter. Further, when the table unit 74 includes the mass sensor 77 and the mass information Jw is obtained, the cutting compensation value acquisition unit can determine the compensation value based on the product length HaP and the measured mass to improve the compensation accuracy.

The information included in the mark M is at least information that can identify at least the product length HaP and the measured mass, and may also include a product name and destination information or may be code information that can identify a link destination of specific information. Further, the format of the mark M may be any of one-dimensional and two-dimensional barcodes. Further, the mark M is not limited to being put by the laser beam Ls, and may be put by an inkjet method.

In the above embodiment, described is the configuration in which the table main body 742 on which the intermediate product P1 is placed is moved upward so that the intermediate product P1 blocks the light beam Ln of the optical sensor device 75, but the present disclosure is not limited to the embodiment. For example, the cut member processing device 7 according to one embodiment may be configured to move the optical sensor device 75 upward or downward while the table main body 742 is set statically.

The cut member processing device 7 according to one embodiment may measure the length multiple times by horizontally moving the position of the optical sensor device 75, i.e., the position of the light beam Ln, to shift the measurement positions of the product length of the intermediate product P1 radially. By this method, an uneven cut state of the cut surface P1*t* or surface roughness of the cut surface P1*t* can be recognized, and the remaining life of the saw blade of the cutting device (circular saw machine 931) can be recognized.

The disclosure of this application relates to the subject described in Japanese Patent Application No. 2022-039471 filed on Mar. 14, 2022, the entire disclosure content of which are hereby incorporated by reference.

The invention claimed is:

1. A cut member processing device, comprising:

a table main body that is movable vertically and on which a cut member, which is cut out from a metal long workpiece by a cutting device, is to be placed so that a cut surface of the cut member is directed upward;

a laser marking device configured to put a mark on the cut surface of the cut member placed on the table main body; and a product length measuring device provided with a position sensor for detecting the cut surface located at a predetermined marking position, the product length measuring device being configured to determine a product length of the cut member based on the predetermined marking position and a vertical position of the table main body when the position sensor detects the cut surface located at the predetermined marking position, a vertical focal point position of a laser beam emitted from the laser marking device is set at the predetermined marking position.

2. The cut member processing device according to claim 1, wherein the position sensor is an optical sensor device configured to emit and receive a light beam horizontally at the predetermined marking position above the table main body, wherein the laser marking device is configured to put the mark on the cut surface located at the predetermined marking position by emitting the laser beam from above.

3. The cut member processing device according to claim 1, further comprising a mass sensor capable of measuring a mass of the cut member based on the position sensor detecting that the cut surface is located at the predetermined marking position.

4. A cutting system, comprising:

a cutting device configured to cut out a cut member from a metal long workpiece;

a cut member processing device according to claim 1; and a robot hand device configured to load the cut member cut out by the cutting device into the cut member processing device.

* * * * *